Feb. 28, 1933.  C. A. LONG, JR  1,899,282
METHOD OF AND DEVICE FOR ADVERTISING
Filed Dec. 29, 1931  2 Sheets-Sheet 1
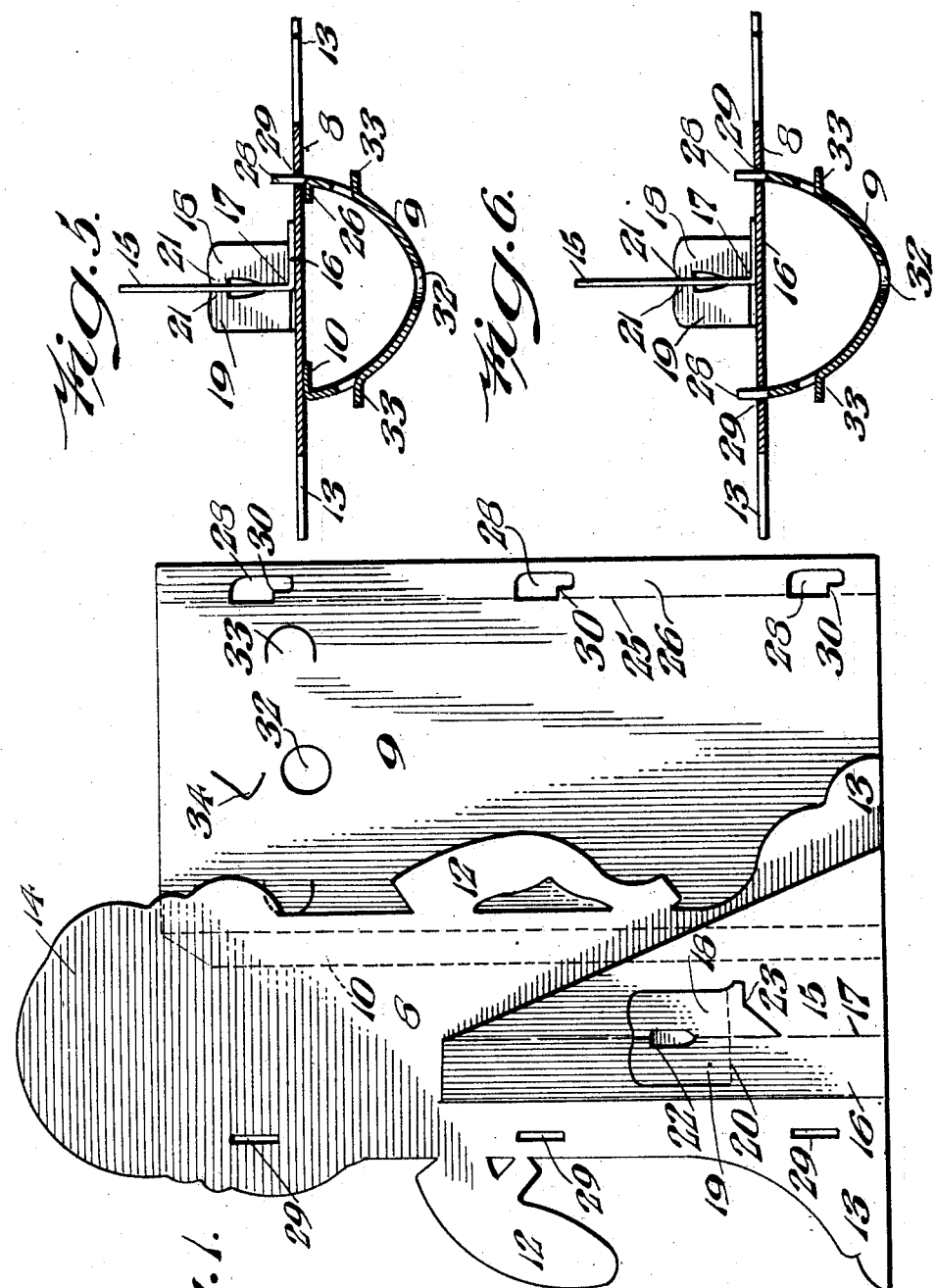
INVENTOR.
CHARLES A. LONG, JR.
BY Louis Necho
ATTORNEY Feb. 28, 1933.                 C. A. LONG, JR                 1,899,282
                    METHOD OF AND DEVICE FOR ADVERTISING
                       Filed Dec. 29, 1931        2 Sheets-Sheet 2
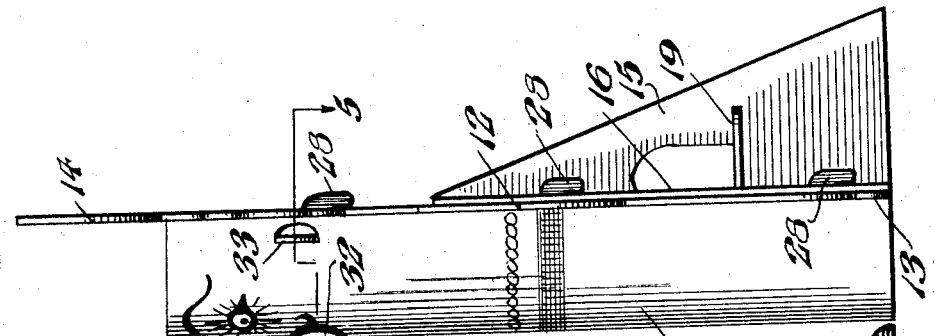
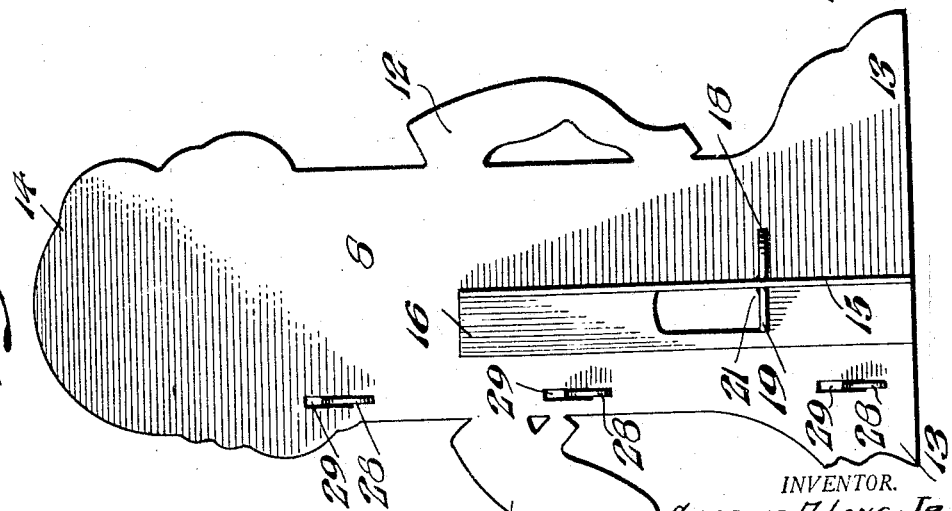
INVENTOR.
CHARLES A. LONG, JR.
BY Louis Necho
ATTORNEY Patented Feb. 28, 1933

1,899,282

UNITED STATES PATENT OFFICE

CHARLES A. LONG, JR., OF HADDON HEIGHTS, NEW JERSEY

METHOD OF AND DEVICE FOR ADVERTISING

Application filed December 29, 1931. Serial No. 583,615.

My invention relates to a new method of advertising goods and it relates to a new advertising device which is made from one or more blanks of sheet material which may be stamped into a special form to represent any given idea, the device when erected or completely assembled being adapted to "personify" the object intended to be represented or advertised.

My invention further relates to an advertising device of this character which is adapted to lend animal personification to the object to be advertised thereby directing and holding attention by lending to the object advertised a personal appeal.

In advertising merchandise for sale it is the customary practice to dress the windows with placards setting forth the merits of the article, its uses, price, etc. Such forms of advertising are rather commonplace and attract very little or no attention, thus resulting in very ineffective advertising.

To overcome this disadvantage, I have conceived the method of so forming the advertising matter as to represent the object advertised in preferably a human form which possesses a serious, humorous or other form of expression, and which purports to convey to the public the advertising message in a direct personal manner.

A further feature of my invention is that the dealers using my novel form of advertising can be supplied with large scale advertising devices for display in their windows and with sets of the same advertisement on a smaller scale to be distributed to the customers where children can cut and erect the miniature advertising devices by way of recreation, thus keeping the advertisement constantly before their eyes and the eyes of their elders and resulting in considerable good will for the object advertised which could not be obtained by ordinary advertising.

To the above ends, my invention consists of a blank formed of any desired sheet material, which blank may be stamped out to include parts which when said blank is finally put in use will represent in a general way the appearance of a human or other animal figure which is capable of being set up without the aid of additional external support, the front of said blank bearing the necessary inscriptions by way of describing and eulogizing the product.

My invention further consists of various other novel features of construction and method, all as hereinafter further described and claimed in connection with the accompanying drawings, in which:

Figure 1 represents a plan view of the back of my novel advertising device shown in the flat or knocked-down condition.

Figure 2 represents the rear elevation of the advertising device in assembled condition.

Figure 3 represents a front view of Figure 2.

Figure 4 represents a side elevation of Figure 3.

Figure 5 represents a section on line 5—5 of Figure 4.

Figure 6 represents a section similar to Figure 5 showing a modified form of my invention.

Referring to the drawings in which like reference characters indicate like parts, my novel advertising device is formed of the blanks 8 and 9 which may be formed integral or which may be secured to each other adhesively or otherwise along the edge 10 as shown in Figures 1 and 5. The blank 8 represents the back portion of the device and is so formed as to have side portions 12 representing arms in folded, straight, bent or other position, the enlarged base portions 13 adapted roughly to represent feet and the upper portion 14 which roughly represents the contour of the head which may be dressed with any desired coiffure or head-dress. The back member 8 is also provided with the easel 15, the edge 16 of which is suitably secured to the blank 8, and which is creased at 17 to permit of the deflection of the easel 15 at right angles with respect to the blank 8 to form a stand or support for the advertising device when in assembled position. To lock the easel 15 in its operative position shown in Figures 5 and 6, a pair of ears 18 and 19 are cut out from the edge 16 and the body of the easel 15, which ears are creased at 20 so as to be folded downwardly into a position at right angles to the blank 8 and the easel 15 with the edges 21 of the ears 18 and 19 bearing against the opposite faces of the easel 15 when holding the latter in position. The ears 18 and 19 are prevented from being folded in a downward direction flat against the blank 8 by engagement of the shoulders 22 thereof against the shoulder 23 in the body of the blank 15. The blank 9 is creased along the line 25, so that its free edge may be turned to form a flange 26, and at the junction of the flange 26 and the edge of the blank 9 are cut the tab or tabs 28 which are adapted to engage appropriate slots 29 when the blank 9 is deflected to the generally arcuate form shown in Figures 3, 4 and 5. The tabs 28 are provided with shoulders 30 which are adapted to engage the bottom edges of the slots 29 to produce a firmly interlocking engagement. The blank 9 is provided with an opening 32 which represents the mouth of the face effect represented in Figure 3 and with the partly cut out tabs 33 which when deflected outwardly from the plane of the blank 9 generally represent ears and with the partly cut out tab 34 which when deflected outwardly from the plane of the blank 9 roughly represents a nose. The front of the blank 9 immediately below the portion 14 of the blank 8 is suitably painted to represent any desired human expression, as is generally illustrated in Figure 3. Since the particular expression desired depends, among other things, on the particular shape or location of such items as the mouth, nose and ears, in collaboration with whatever is added by way of eyes and eyebrows, it is obvious that this invention is not limited to the particular shape and location of the ears, nose and mouth. The same is true of the arm portions 12 and the feet portions 13, which may be made of any suitable contour, it being already explained that the upper portion 14 of the blank 8 can represent any desired form of head, with or without a head-dress. The balance of the blank 9 and the portions of the blank 8 visible in Figure 3 are available for the inscription of any desired advertising material, such as "John Doe's cigarettes" or "Richard Doe's radios". It is also to be noted that the particular expression or form of the human figure ultimately produced according to my invention will depend on the particular article which it is desired to advertise. Thus, if cigarettes are to be advertised, it is within the scope of my invention to add the form of a cigarette to the representation in Figure 3 either in the mouth of the figure or in one of the arms thereof, etc.

In Figure 6 I have shown a modified form of my invention, wherein in lieu of permanently attaching the blank 9 to the blank 8 at 10, as described in connection with Figure 1, I make the blank 9 an entirely separate piece from the blank 8, and I provide the longitudinal edges of the blank 9 with tongues 28 which will engage grooves 29 along both of the longitudinal edges of the blank 8 in the manner heretofore described in connection with the primary form of the invention, the rest of the structure being identical and needing no further description.

It will thus be seen that I have evolved a novel advertising device which is of extremely simple construction consisting of one or more blanks which are preformed to be capable of assembly or erection by the consumer into the personification of the article to be advertised, or into a rendition of a human embodiment of the device advertised.

It will thus be seen that I have devised a novel method of advertising any desired object by giving such object an animal embodiment or representation which is very inexpensively produced from one or more blanks of sheet material stamped in any desired predetermined forms, which blanks may be inscribed and decorated as desired or as dictated by the characteristics of the object being advertised and other attendant circumstances, said blanks being shipped in knocked-down condition and being capable of assembly and erection into operative position at the point of use without the aid of extraneous devices and at minimum cost in labor and effort.

Having thus described my invention, what I claim as new and desire to secure by Letters Patent is:

1. An advertising device for producing an animated representation of the object advertised, comprising a back blank, a foldable easel for said blank comprising a portion contiguous with said back blank, a portion deflectable at an angle to said body blank and means for locking the deflectable portion in its operative position with respect to said blank, a front blank securable to said back blank, said front blank having indicia thereon and having portions cut out therefrom to represent the characteristic features of any animal in the likeness of which the object advertised is to be represented, and tabs on said front blank adapted to engage slots in said back blank for securing said blanks in assembled relation, said back blank being formed to coact with said front blank in effecting the desired animated representation.

2. An advertising device adapted to portray an animated representation of the object to be advertised, comprising a blank representing a suitable background, a blank representing an animal and having a longitudinal edge thereof permanently secured to the front longitudinal edge of said background blank, there being locking apertures in the other longitudinal edge of said "animal" blank adapted to engage corresponding locking tabs on the other longitudinal edge of said background blank to hold said animal blank in curved relation to said back ground blank, an easel blank permanently secured to said background blank in a normally flat position, and means for locking said easel in its operative position at angle with respect to and to support the assembled device, there being partly cut out parts in said animal blank which are adapted to be deflected out of the plane of said blank to represent characteristic features of the animal represented.

In testimony whereof, I affix my signature.

CHARLES A. LONG, Jr.